US012395474B2

(12) United States Patent
Deval et al.

(10) Patent No.: US 12,395,474 B2
(45) Date of Patent: Aug. 19, 2025

(54) TECHNOLOGIES FOR ACCELERATED QUIC PACKET PROCESSING WITH HARDWARE OFFLOADS

(71) Applicant: Intel Corporation, Santa Clara, CA (US)

(72) Inventors: Manasi Deval, Portland, OR (US); Gregory Bowers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/514,713

(22) Filed: Nov. 20, 2023

(65) Prior Publication Data

US 2024/0121225 A1 Apr. 11, 2024

Related U.S. Application Data

(63) Continuation of application No. 17/744,296, filed on May 13, 2022, now Pat. No. 11,870,759, which is a (Continued)

(51) Int. Cl.
*H04L 29/06* (2006.01)
*H04L 9/08* (2006.01)
(Continued)

(52) U.S. Cl.
CPC .......... *H04L 63/0428* (2013.01); *H04L 9/088* (2013.01); *H04L 63/06* (2013.01);
(Continued)

(58) Field of Classification Search
CPC .................................................. H04L 63/0428
See application file for complete search history.

(56) References Cited

U.S. PATENT DOCUMENTS 7,526,577 B2 4/2009 Pinkerton et al.
8,244,864 B1 8/2012 Bahl et al.
(Continued)

FOREIGN PATENT DOCUMENTS

CN 104718720 B 4/2018
CN 106921618 B 11/2019
(Continued)

OTHER PUBLICATIONS

Anonymous: "Crypto Offload", Chelsio Communications, XP055594894, Online: https://web.archive.org/web/20171122062421/http://www.chelsio.com:80/crypto-offload/, Nov. 2017, 2 pages.
(Continued)

*Primary Examiner* — Bradley W Holder
(74) *Attorney, Agent, or Firm* — Compass IP Law PC

(57) ABSTRACT

Technologies for accelerated QUIC packet processing include a computing device having a network controller. The computing device programs the network controller with an encryption key associated with a QUIC protocol connection. The computing device may pass a QUIC packet to the network controller, which encrypts a payload of the QUIC packet using the encryption key. The network controller may segment the QUIC packet into multiple segmented QUIC packets before encryption. The network controller transmits encrypted QUIC packets to a remote host. The network controller may receive encrypted QUIC packets from a remote host. The network controller decrypts the encrypted payload of received QUIC packets and may evaluate an assignment function with an entropy source in the received QUIC packets and forward the received QUIC packets to a receive queue based on the assignment function. Each receive queue may be associated with a processor core. Other embodiments are described and claimed.

14 Claims, 5 Drawing Sheets

200
102
COMPUTING DEVICE
202
APPLICATION
204
QUIC PROTOCOL STACK
206
NIC DRIVER
132
NIC
208
CRYPTOGRAPHIC ACCELERATOR
210
LARGE SEND OFFLOAD (LSO) ACCELERATOR
212
RECEIVE-SIDE SCALING (RSS) ACCELERATOR

Related U.S. Application Data continuation of application No. 16/022,843, filed on Jun. 29, 2018, now Pat. No. 11,336,625.

(60) Provisional application No. 62/644,045, filed on Mar. 16, 2018.

(51) Int. Cl.

| | |
|---|---|
| ***H04L 9/40*** | (2022.01) |
| ***H04L 69/16*** | (2022.01) |
| ***H04L 69/164*** | (2022.01) |
| ***H04L 69/321*** | (2022.01) |
| ***H04L 69/324*** | (2022.01) |

(52) U.S. Cl.
CPC .......... *H04L 69/161* (2013.01); *H04L 69/164* (2013.01); *H04L 69/321* (2013.01); *H04L 69/324* (2013.01)

(56) References Cited

U.S. PATENT DOCUMENTS

| | | | |
|---|---|---|---|
| 10,182,039 | B2 | 1/2019 | Loprieno et al. |
| 10,199,989 | B2 | 2/2019 | Seth et al. |
| 10,785,020 | B2 | 9/2020 | Balasubramanian et al. |
| 10,911,491 | B2 | 2/2021 | Kraemer et al. |
| 11,005,771 | B2 | 5/2021 | Pismenny et al. |
| 11,095,758 | B2 | 8/2021 | Masputra et al. |
| 11,115,504 | B2 | 9/2021 | Balasubramanian et al. |
| 11,184,465 | B2 | 11/2021 | Wang et al. |
| 11,336,625 | B2 | 5/2022 | Deval et al. |
| 11,483,296 | B1 | 10/2022 | Diamant et al. |
| 11,533,655 | B2 | 12/2022 | Sarker et al. |
| 11,870,759 | B2 | 1/2024 | Deval |
| 2001/0052072 | A1 | 12/2001 | Jung |
| 2004/0143734 | A1 | 7/2004 | Buer et al. |
| 2005/0195851 | A1 | 9/2005 | Banerjee et al. |
| 2006/0129676 | A1 | 6/2006 | Modi et al. |
| 2008/0042773 | A1 | 2/2008 | Koriyama |
| 2008/0304481 | A1 | 12/2008 | Gurney et al. |
| 2009/0016334 | A1 | 1/2009 | Forsberg et al. |
| 2010/0283635 | A1 | 11/2010 | Brinkman et al. |
| 2010/0325463 | A1 * | 12/2010 | Lindsay .................. G06F 1/325 710/314 |
| 2014/0258705 | A1 | 9/2014 | Roskind et al. |
| 2017/0118314 | A1 * | 4/2017 | Lin ..................... H04L 63/0428 |
| 2017/0180329 | A1 | 6/2017 | Lin et al. |
| 2019/0044705 | A1 | 2/2019 | Deval et al. |
| 2019/0124054 | A1 | 4/2019 | Zhang et al. |
| 2019/0182114 | A1 * | 6/2019 | Tavridis .................. H04L 41/16 |
| 2019/0199835 | A1 | 6/2019 | Deval et al. |
| 2019/0229903 | A1 | 7/2019 | Balasubramanian et al. |
| 2019/0268305 | A1 * | 8/2019 | Xu ........................ G06F 16/285 |
| 2020/0403919 | A1 | 12/2020 | Cui et al. |

FOREIGN PATENT DOCUMENTS

| | | | |
|---|---|---|---|
| CN | 106656909 | B | 2/2020 |
| EP | 3725057 | A1 | 10/2020 |

OTHER PUBLICATIONS

Authors et al. Disclosed Anonymously, "Method for efficiently offloading cryptographic processing of receive traffic," IP.com Prior Art Database Technical Disclosure, 2003, IPCOM000012719D (Year: 2003).

European First Office Action, (EP Exam Report Article 94(3) EPC), for Patent Application No. 21170247.7, Mailed May 16, 2023, 7 pages.

European Office action for European patent application No. 19157598.4, dated Jul. 13, 2020 (9 pages).

Extended European search report for European patent application No. 19157598.4, dated Jun. 17, 2019 (13 pages).

Extended European Search Report for Patent Application No. 21170247.7, Mailed Jul. 16, 2021, 13 pages.

Final Office Action for U.S. Appl. No. 16/268,306, Mailed Aug. 16, 2023, 64 pages.

Final Office Action for U.S. Appl. No. 16/268,306, Mailed Jun. 10, 2022, 35 pages.

First Office Action for U.S. Appl. No. 16/268,306, Mailed Jan. 7, 2022, 27 pages.

First Office Action for U.S. Appl. No. 17/744,296, Mailed Apr. 27, 2023, 18 pages.

G. Sabin and M. Rashti, "Security offload using the SmartN IC, A programmable 10 Gbps ethernet N IC," 2015 National Aerospace and Electronics Conference (NAECON), Dayton, OH, USA, 2015, pp. 273-276, doi: 10.1109/NAECON.2015.7443082 (Year: 2015).

Hamilton, R. et al., "QUIC: A UDP-Based Secure and Reliable Transport for HTTP/2 draft-tsvwg-quic-protocol-02", Network Working Group, Jan. 2016, 37 pages.

Iyengar, Jana and Thomson, Martin, "QUIC: A UDP-Based Multiplexed and Secure Transport", Internet Draft, https://datatracker.ietf.org/doc/html/draft-ietf-quic-transport-08, Dec. 5, 2017, 95 pages.

Japanese and English Translation of Japanese First Office Action for Patent Application No. 2019-009999, Mailed Feb. 28, 2023, 6 pages.

Langley, Adam, et al., "The QUIC Transport Protocol: Design and Internet-Scale Deployment", SIGCOMM '17, Aug. 21-25, 2017, Los Angeles, CA, USA, 14 pages.

M. Elbeshtli, M. Dixon and T. Koziniec, "Design consideration for efficient network interface supporting the Large Receive Offload with embedded RISC," 2013 36th International Conference on Telecommunications and Signal Processing (TSP), 2013, pp. 282-289, doi: 10.1109/TSP.2013.6613937. (Year: 2013).

Notice of Allowance for U.S. Appl. No. 16/022,843, Mailed Jan. 12, 2022, 16 pages.

Notice of Allowance for U.S. Appl. No. 17/744,296, Mailed Aug. 21, 2023, 15 pages.

O. Hohlfeld et al., "Application-Agnostic Offloading of Datagram Processing," 2018 30th International Teletraffic Congress (ITC 30), 2018, pp. 46-54, doi: 10.1109/ITC30.2018.00015. (Year: 2018).

Praveen Balasubramanian, "RE: hardware offload (was: Packet number encryption)," X 1-3, INV. 8-10, 15 H04L29/06 IETF Mai 1 Archive, Feb. 9, 2018 (Feb. 9, 2018).

Second Office Action for U.S. Appl. No. 16/268,306, Mailed Jan. 30, 2023, 52 pages.

Stanwyck, Don, "Windows Networking: Offloads and Optimizations," Windows WinHEC Fall 2017 Workshop, Dec. 2017, 43 pages.

Trammell, Brian, "[QUIC] Segment offload for UDP-based protocols Re: Requirements," IETF Mail Archive, Jun. 2016, 2 pages.

Korean and English Translation of the Notice of Preliminary Rejection for Patent Application No. 10-2019-0016641, Mailed May 17, 2024, 17 pages.

Third Office Action for U.S. Appl. No. 16/268,306, Mailed Feb. 1, 2024, 68 pages.

First Office Action for U.S. Appl. No. 18/400,250, Mailed Aug. 1, 2024, 27 pages.

Iyengar, J. et al., "QUIC: A UDP-Based Multiplexed and Secure Transport draft-ietf-quic-transport-16", IETF, Oct. 23, 2018, 268 pages.

Huston, Geoff, "A look at QUIC use", APNIC Blog: https://blog.apnic.net/2022/07/11/a-look-at-quic-use/, Jul. 2022, 9 pages.

Stack Exchange, "How does QUIC encrypt packets containing multiple CRYPTO frames?", https://networkengineering.stackexchange.com/questions/80090/how-does-quic-encrypt-packets-containing-multiple-crypto-frames, Oct. 2022, 2 pages.

Korean and English Translation of the Second Notice of Preliminary Rejection for Patent Application No. 10-2019-0016641, Mailed Jan. 21, 2025, 4 pages.

* cited by examiner

TECHNOLOGIES FOR ACCELERATED QUIC PACKET PROCESSING WITH HARDWARE OFFLOADS

CROSS-REFERENCE TO RELATED APPLICATION

The present application is a continuation of U.S. patent application Ser. No. 17/744,296, filed May 13, 2022, which is a continuation of U.S. patent application Ser. No. 16/022,843, filed Jun. 29, 2018, and now is U.S. Pat. No. 11,336,625, which claims the benefit of U.S. Provisional Patent Application No. 62/644,045, filed Mar. 16, 2018. The entire specifications of which are incorporated herein by reference in their entirety.

BACKGROUND

QUIC (Quick UDP Internet Connections) is a relatively new network protocol that may be used to replace traditional network protocols such as Transmission Control Protocol (TCP). QUIC is a transport layer protocol built on top of UDP (User Datagram Protocol). QUIC supports a set of multiplexed connections between two endpoints over UDP, and may provide security protection equivalent to TLS/SSL, along with reduced connection and transport latency, and bandwidth estimation in each direction to avoid congestion. Thus, QUIC is intended to provide improved encryption and improved connection latency compared to traditional protocols such as TCP, while also providing flexible congestion management and compatibility with existing network infrastructure. Although relatively new, QUIC already forms 7% of all Internet traffic, and certain large network users are currently enabling QUIC. Current QUIC protocol implementations (e.g., user mode protocol stacks and libraries) are fully implemented in software.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
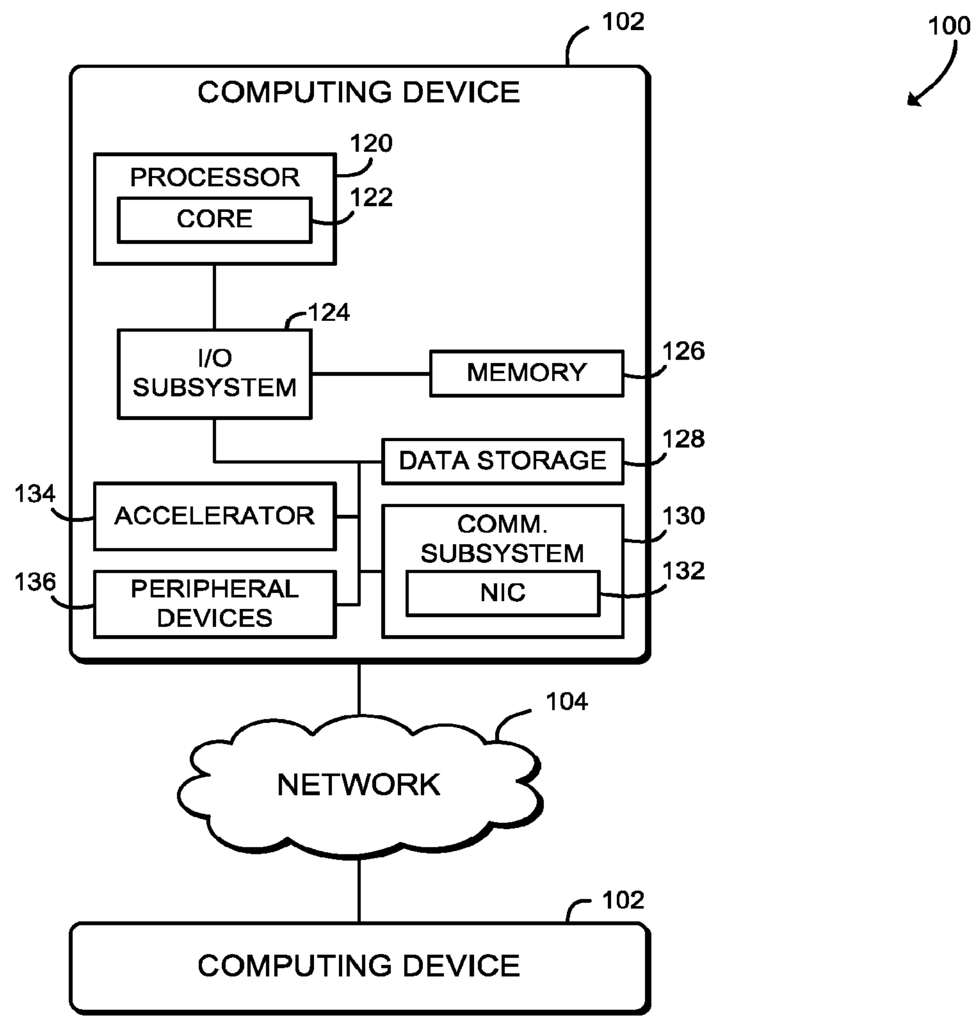
FIG. 1 is a simplified block diagram of at least one embodiment of a system for accelerated QUIC packet processing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for accelerated QUIC packet processing includes multiple computing devices 102 in communication over a network 104. Each computing device includes hardware accelerator support for QUIC protocol network traffic. On transmit, the hardware accelerator encrypts the QUIC payload, and segments large QUIC packets into smaller packets as needed. On receive, the hardware accelerator decrypts the QUIC payload, and uses one of a number of available methods to select the receive queue in order to spread host processing across many processor 120 cores. Thus, the computing device 102 may provide greatly improved QUIC protocol performance, providing improved throughput and reduced processor usage when compared to software-only QUIC used by current solutions. Additionally, hardware accelerated QUIC protocol packet processing may reduce processor cycle usage of the host processor, providing value for cloud service providers.

Each computing device 102 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively include a processor 120, an input/output subsystem 124, a memory 126, a data storage device 128, a communication subsystem 130, an accelerator 134, and/or other components and devices commonly found in a server or similar computing device. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 is illustratively a multi-core processor, however, in other embodiments the processor 120 may be embodied as a single or multi-core processor(s), digital signal processor, microcontroller, or other processor or processing/controlling circuit. The illustrative processor 120 includes multiple processor cores 122, each of which is an independent, general-purpose processing unit capable of executing programmed instructions. For example, each processor core 122 may execute instructions from a general-purpose instruction set architecture (ISA) such as IA-32 or Intel® 64. Although illustrated with one processor core 122, in some embodiments the processor 120 may include a larger number of processor cores 122, for example four processor cores 122, fourteen processor cores 122, twenty-eight processor cores 122, or a different number. Additionally, although illustrated as including a single processor 120, in some embodiments the computing device 102 may be embodied as a multi-socket server with multiple processors 120.

The memory 126 may be embodied as any type of volatile or non-volatile memory or data storage capable of performing the functions described herein. In operation, the memory 126 may store various data and software used during operation of the computing device 102 such operating systems, applications, programs, libraries, and drivers. The memory 126 is communicatively coupled to the processor 120 via the I/O subsystem 124, which may be embodied as circuitry and/or components to facilitate input/output operations with the processor 120, the accelerator 134, the memory 126, and other components of the computing device 102. For example, the I/O subsystem 124 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 102, on a single integrated circuit chip.

The data storage device 128 may be embodied as any type of device or devices configured for short-term or long-term storage of data such as, for example, memory devices and circuits, memory cards, hard disk drives, solid-state drives, non-volatile flash memory, or other data storage devices. The computing device 102 also includes the communication subsystem 130, which may be embodied as any communication circuit, device, or collection thereof, capable of enabling communications between the computing device 102 and other remote devices over the computer network 104. For example, the communication subsystem 130 may be embodied as or otherwise include a network interface controller (NIC) 132 or other network controller for sending and/or receiving network data with remote devices. The NIC 132 may be embodied as any network interface card, network adapter, host fabric interface, network coprocessor, or other component that connects the computing device 102 to the network 104. The communication subsystem 130 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication. In some embodiments, the communication subsystem 132 and/or the NIC 132 may form a portion of an SoC and be incorporated along with the processor 120 and other components of the computing device 102 on a single integrated circuit chip.

As shown in FIG. 1, the computing device 102 also may include the accelerator 134. The accelerator 134 may be embodied as a field-programmable gate array (FPGA), an application-specific integrated circuit (ASIC), an embedded digital logic block, a coprocessor, or other digital logic device capable of performing accelerated network functions. Although illustrated as separate components, it should be understood that in some embodiments the accelerator 134 may be incorporated in or otherwise coupled to the NIC 132. Additionally or alternative, in some embodiments, the accelerator 134 may be embodied as an FPGA included in a multi-chip package with the processor 120 and the NIC 132. The accelerator 134 may be coupled to the processor 120 and/or the NIC 132 via multiple high-speed connection interfaces including coherent and/or non-coherent interconnects.

The computing device 102 may further include one or more peripheral devices 136. The peripheral devices 136 may include any number of additional input/output devices, interface devices, and/or other peripheral devices. For example, in some embodiments, the peripheral devices 136 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Additionally or alternatively, although illustrated as being included in a computing device 102, it should be understood that one or more components of the computing device 102, such as the processor 120, memory 126, data storage device 128, NIC 132, and/or accelerator 134 may be physically disaggregated or otherwise distributed among multiple racks, sleds, or other computing chassis. In those embodiments, one or more of the computing devices 102 may be pooled or otherwise composed from multiple disaggregated components. In those embodiments, the NIC 132 may be included in a virtual switch or other virtualized environment.

The computing devices 102 may be configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), and/or a wired or wireless wide area network (WAN). As such, the network 104 may include any number of additional devices, such as additional computers, routers, and switches, to facilitate communications among the devices of the system 100. In the illustrative embodiment, the network 104 is embodied as a local Ethernet network.

Figure 2:
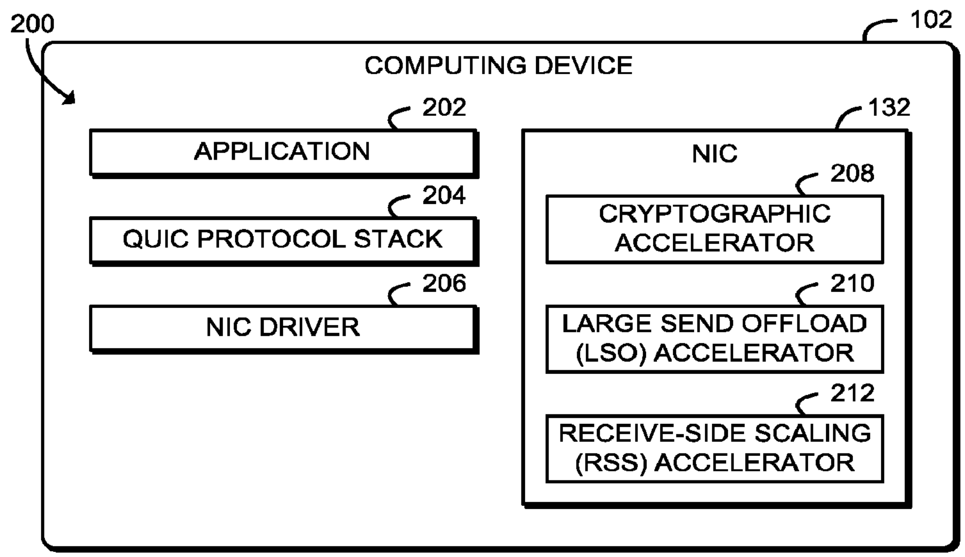
FIG. 2 is a simplified block diagram of at least one embodiment of an environment of a computing device of FIG. 1.

Referring now to FIG. 2, in an illustrative embodiment, the computing device 102 establishes an environment 200 during operation. The illustrative environment 200 includes an application 202, a QUIC protocol stack 204, a NIC driver 206, and the NIC 132. The NIC 132 further includes a cryptographic accelerator 208, a large send offload (LSO) accelerator 210, and a receive-side scaling (RSS) accelerator 212. As shown, the various components of the environment 200 may be embodied as hardware, microcode, firmware, software, or a combination thereof. As such, in some embodiments, one or more of the components of the environment 200 may be embodied as circuitry or collection of electrical devices (e.g., application circuitry 202, QUIC protocol stack circuitry 204, driver circuitry 206, cryptographic accelerator circuitry 208, LSO accelerator circuitry 210, and/or RSS accelerator circuitry 212). It should be appreciated that, in such embodiments, one or more of the application circuitry 202, the QUIC protocol stack circuitry 204, the driver circuitry 206, the cryptographic accelerator circuitry 208, the LSO accelerator circuitry 210, and/or the RSS accelerator circuitry 212 may form a portion of the processor 120, the NIC 132, the accelerator 134, the I/O subsystem 124, and/or other components of the computing device 102. In the illustrative embodiment, the application 202, the QUIC protocol stack 204, and the NIC driver 206 are executed by one or more processor cores 122 of the processor 120, and the cryptographic accelerator 208, the LSO accelerator 210, and the RSS accelerator 212 are embodied as hardware, firmware, microcode, or other resources of the NIC 132. Additionally or alternatively, in some embodiments, the cryptographic accelerator 208, the LSO accelerator 210, and/or the RSS accelerator 212 may be embodied as or otherwise included in one or more standalone accelerators 134. Additionally, in some embodiments, one or more of the illustrative components may form a portion of another component and/or one or more of the illustrative components may be independent of one another.

The application 202 may be configured to generate network data for transmission and/or to process received network data. For example, the application 202 may store packet data in one or more application buffers in the memory 126. The application 202 may be embodied as any client, server, or other network application executed by the computing device 102.

The QUIC protocol stack 204 is configured to generate QUIC packets for transmission. Each QUIC packet may be embodied as a UDP packet that includes a QUIC header and a plaintext payload. Each QUIC packet may be associated with a QUIC connection with a remote host (e.g., a remote computing device 102). The payload may include multiple multiplexed QUIC streams, and thus may also include QUIC stream headers. The QUIC header of each QUIC packet includes a packet number. In some embodiments, each QUIC packet may be larger than a maximum segment size (MSS) supported by the network 104 and/or other devices of the system 100. The QUIC protocol stack 204 may be configured to calculate a number of segmented QUIC packets to be generated from each QUIC packet based on the length of that QUIC packet, and to update the packet number for the next QUIC packet based the number of segmented QUIC packets that will be generated. The QUIC protocol stack 204 is further configured to process received network packets by one or more processor cores 122 of the computing device 102. The processor cores 122 may process network packets in response to those packets being forwarded to an associated receive queue.

The NIC driver 206 is configured to program the NIC 132 with an encryption key associated with each QUIC connection. The NIC driver 206 is further configured to pass QUIC packets to the network controller 132 for transmission. The NIC driver 206 may be further configured to determine whether the NIC 132 is capable of large send offload (LSO) and, if not, to segment QUIC packets into multiple segmented QUIC packets. The NIC driver 206 may be further configured to configure the NIC 132 with a predetermined entropy source. The entropy source may be embodied as a field of the QUIC header, such as the QUIC connection identifier or the QUIC short packet type field, as a field of the plaintext payload, such as the QUIC stream identifier, as a tuple that includes UDP source IP address, UDP destination IP address, UDP source port, and UDP destination port, or as other data extracted from each received network packet. The NIC driver 206 may be further configured to configure the NIC 132 with a predetermined assignment function, which may be embodied as a hash function, a filter function, or other function that uses the entropy source as input. The driver 206 may be further configured to associate processor cores 122 with respective receive queues.

The LSO accelerator 210 is configured to determine whether a QUIC packet is larger than the predetermined MSS and, if so, to segment the QUIC packet into multiple segmented QUIC packets. Each of the segmented QUIC packets includes a plaintext payload and is not larger than the predetermined MSS. The LSO accelerator 210 may be further configured to copy the QUIC header from the QUIC packet to each of the segmented QUIC packets, and to update the packet number of the QUIC header of each of the segmented QUIC packets.

The cryptographic accelerator 208 is configured to encrypt the plaintext payload of each QUIC packet and/or segmented QUIC packet with the encryption key to generate an encrypted payload. In some embodiments, QUIC encryption may separately encrypt the packet number after encryption of the payload. The cryptographic accelerator 208 may be further configured to calculate authentication data for each QUIC packet and/or segmented QUIC packet and to add the authentication data to the respective QUIC packet. The cryptographic accelerator 208 is further configured to decrypt the encrypted payload of received QUIC packets with the encryption key to generate the corresponding plaintext payload. The cryptographic accelerator 208 may be further configured to verify received QUIC packets using authentication data included in the received QUIC packets.

The RSS accelerator 212 is configured to evaluate the predetermined assignment function with the predetermined entropy source for each received QUIC packet to generate a queue identifier in response to decrypting the encrypted payload. The RSS accelerator 212 is further configured to forward each received QUIC packet to a receive queue associated with the corresponding queue identifier.

The NIC 132 is configured to transmit QUIC packets and/or segmented QUIC packets, including the encrypted payload, to the remote host associated with the QUIC connection in response to encrypting the plaintext payload. The NIC 132 is further configured to receive network packets from remote hosts and determine whether each received network packet is a QUIC packet. If a received network packet is a QUIC packet, the NIC 132 may process the received QUIC packet with the cryptographic accelerator 208 and/or the RSS accelerator 212 as described above.

Figure 3:
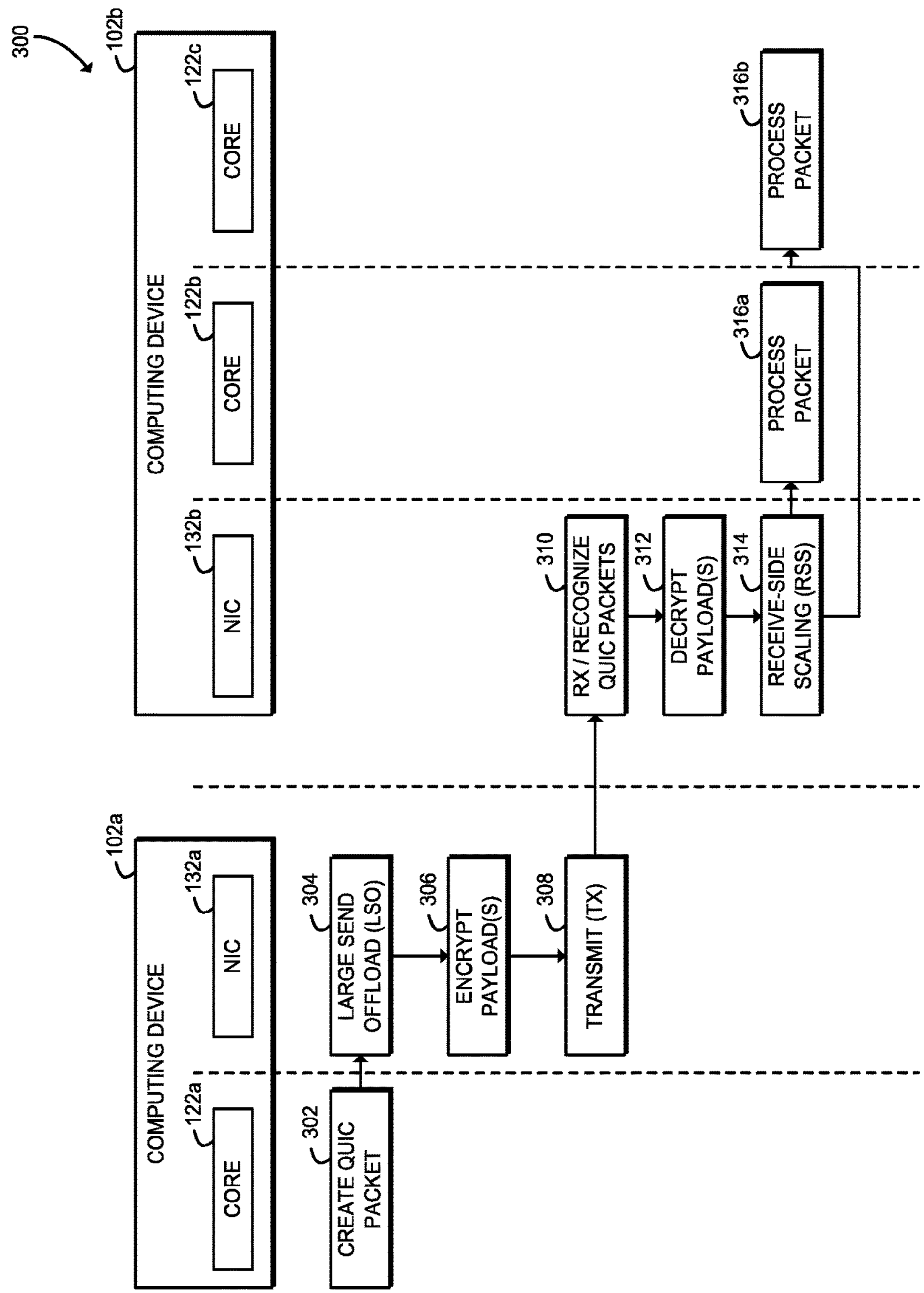
FIG. 3 is a simplified interaction diagram of at least one embodiment of a method for accelerating QUIC packet processing with hardware offloads that may be executed by the system of FIGS. 1-2.

Referring now to FIG. 3, in use, two computing devices 102*a*, 102*b* of the system 100 may execute a method 300 for accelerated QUIC packet processing. It should be appreciated that, in some embodiments, the operations of the method 300 may be performed by one or more components of the environment 200 of each computing device 102 as shown in FIG. 2. In the illustrative example, the computing device 102*a* is the transmitter and the computing device 102*b* is the receiver; however, in some embodiments each computing device 102*a*, 102*b* may perform the operations of both transmitter and receiver. The method 300 begins in block 302, in which the computing device 102*a*, with the processor core 122*a*, creates a QUIC packet. For example, the QUIC packet may be generated by one or more of the application 202, the QUIC protocol stack 204, and the NIC driver 206. The QUIC packet may include QUIC headers and a plaintext payload, which may include one or more multiplexed QUIC streams. The processor 122*a* passes the QUIC packet to the NIC 132*a* for processing.

In block 304, computing device 102*a*, with the NIC 132*a*, may perform large send offload (LSO) acceleration. In some embodiments, the QUIC packet generated by the processor 122*a* may be larger than the maximum segment size (MSS) of the network 104 or other devices of the system 100. The NIC 132*a* may segment the large QUIC packet into multiple smaller QUIC packets for transmission. One potential embodiment of a method for LSO acceleration is described further below in connection with FIG. 4.

In block 306, the computing device 102*a*, with the NIC 132*a*, encrypts the plaintext payload of one or more QUIC packets for transmission. The NIC 132*a* may encrypt the payload using any encryption protocol appropriate for the QUIC protocol, including an application-layer encryption protocol. The NIC 132*a* may be programmed by the core 122*a* with encryption keys for each QUIC connection. One potential embodiment of a method for acceleration of encryption is described further below in connection with FIG. 5.

In block 308 the computing device 102*a*, with the NIC 132*a*, transmits the encrypted QUIC packet(s) to the remote computing device 102*b*. In block 310, the computing device 102*b*, with the NIC 132*b*, receives the encrypted QUIC packets. The NIC 132*b* may recognize received packets as QUIC packets and then perform additional processing (e.g., decryption and/or receive-side scaling and filtering). For example, the NIC 132 may recognize QUIC packets as UDP packets with specific destination ports.

In block 312, the computing device 102*b*, with the NIC 132*b*, decrypts the encrypted payload of the received QUIC packets. The NIC 132*b* may decrypt the payload using any encryption protocol appropriate for the QUIC protocol. The NIC 132*b* may be programmed by the core 122*b* with encryption keys for each QUIC connection. One potential embodiment of a method for acceleration of decryption is described further below in connection with FIG. 6.

In block 314, the computing device 102*b*, with the NIC 132*b*, performs receive-side scaling (RSS) and filtering of the received QUIC packets. The NIC 132*b* distributes the received QUIC packets to one or more processor cores 122 for processing (e.g., the illustrated processor cores 122*b*, 122*c*). The NIC 132*b* may be programmed with one or more assignment functions and associated entropy sources to control distribution of QUIC packets to processor cores 122. For example, the NIC 132*b* may evenly distribute QUIC packets among the processor cores 122, or the NIC 132*b* may filter the received QUIC packets to particular processor cores 122. One potential embodiment of a method for RSS and filtering acceleration is described below in connection with FIG. 7.

In blocks 316*a*, 316*b* the computing device 102*b*, with the processor cores 122*b*, 122*c*, respectively, processes the received QUIC packets. The computing device 102*b* may, for example, process QUIC headers with the QUIC protocol stack 204 and process decrypted payload data with the application 202. After distributing the packets to the processor cores 122 for processing, the method 300 is completed. The method 300 may be repeated to process additional packets.

Figure 4:
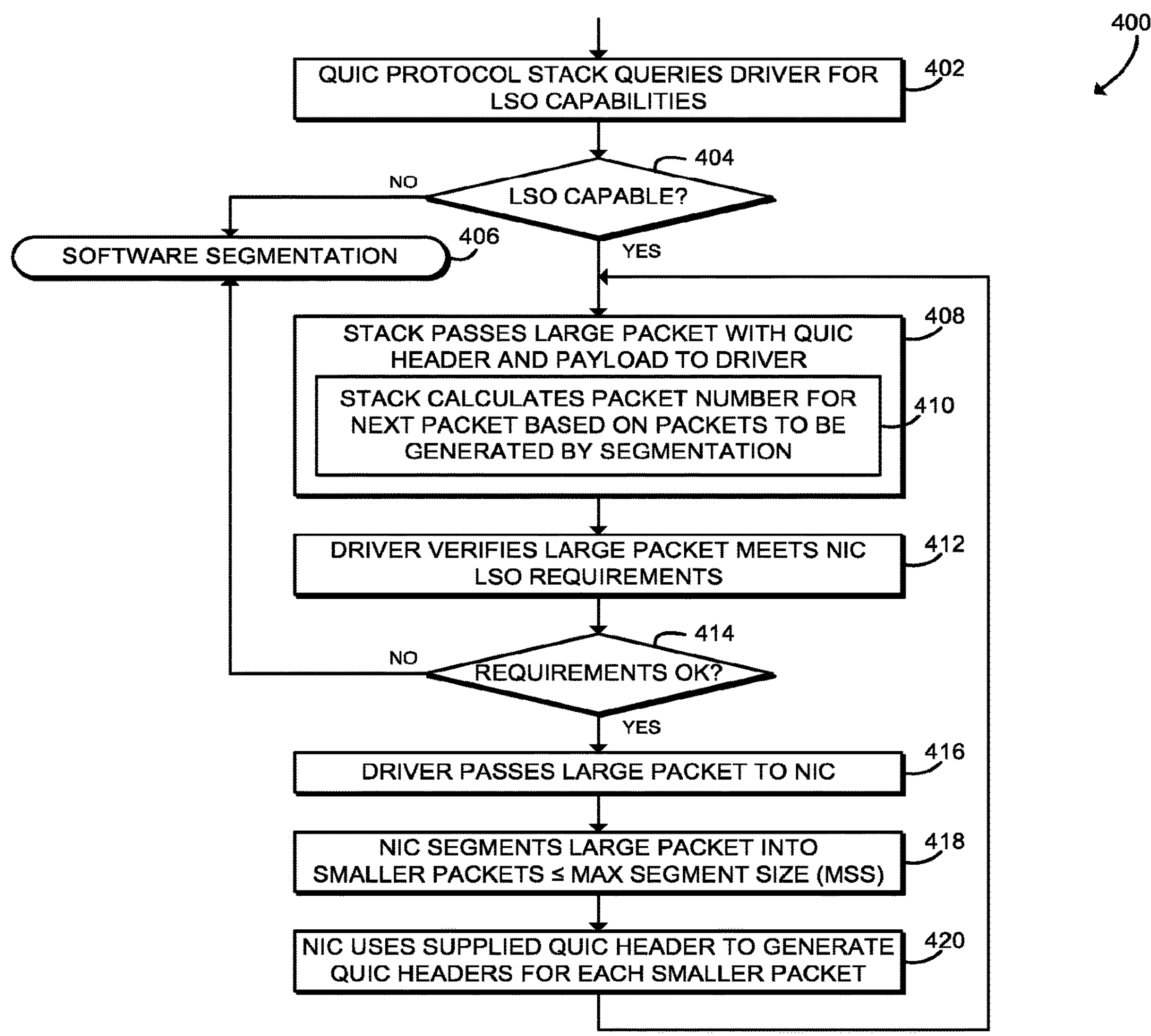
FIG. 4 is a simplified flow diagram of at least one embodiment of a method for accelerated large packet segmentation that may be executed by a computing device of FIGS. 1-2.

Referring now to FIG. 4, in use, the computing device 102 may execute a method 400 for accelerated large packet segmentation. The method 400 may be executed, for example, in connection with block 304 of FIG. 3, as described above. It should be appreciated that, in some embodiments, the operations of the method 400 may be performed by one or more components of the environment 200 of the computing device 102 as shown in FIG. 2. The method 400 begins in block 402, in which the QUIC protocol stack 204 of the computing device 102 queries the NIC driver 206 for large send offload (LSO) capabilities of the NIC 132, also known as transit segmentation offload (TSO) capabilities. The QUIC protocol stack 204 may query the NIC driver 206, for example, during initialization of the QUIC protocol stack 204 and/or otherwise prior to processing outgoing QUIC packets. In block 404, the computing device 102 determines whether the NIC 132 is capable of performing LSO acceleration. If not, the method 400 branches to block 406, in which the computing device 102 performs software segmentation of large QUIC packets. For example, the QUIC protocol stack 204 and/or the driver 206 may segment large QUIC packets into smaller QUIC packets using processing resources of the processor 120. Referring back to block 404, if the NIC 132 is capable of LSO acceleration, the method 400 advances to block 408.

In block 408, the QUIC protocol stack 204 passes a large packet with a QUIC header and payload to the NIC driver 206. The QUIC protocol stack 204 may generate the packet based on data provided by the application 202 in an application buffer or other memory buffer. The QUIC protocol stack 204 may add or otherwise frame the packet data with headers or other data to create a QUIC packet. The QUIC headers include a packet number, which may be stored and updated by the QUIC protocol stack 204. The resulting large packet has a size greater than the maximum segment size (MSS) of the network 104 and/or of other devices of the system 100. The payload of the large packet may include one or more QUIC stream headers, which may be created within the payload at locations matching segment boundaries. In block 410, the QUIC protocol stack 204 calculates a packet number for the next packet to be transmitted, based on the number of segmented QUIC packets to be generated by segmentation. As an illustrative example, the QUIC protocol stack 204 may determine that, based on the size of the large QUIC packet, the LSO accelerator 210 will generate three segmented QUIC packets. In that illustrative example, the QUIC protocol stack 204 may increment the packet number by three. The next-transmitted QUIC packet would then include the correct packet number. Note that the QUIC protocol stack 204 may calculate the packet number for the next QUIC packet without actually performing packet segmentation.

In block 412, the NIC driver 206 verifies whether the large QUIC packet received from the QUIC protocol stack meets any hardware-specific requirements of the LSO accelerator 210. In block 414, the NIC driver 206 checks whether the large packet satisfies the requirements of the LSO accelerator 210. If not, the method 400 branches to block 406 to perform software segmentation, as described above. The NIC driver 206 may also indicate an error to the QUIC protocol stack 204. Referring back to block 414, if the large packet satisfies the requirements of the LSO accelerator 210, the method 400 advances to block 416.

In block 416, the NIC driver 206 passes the large packet to the NIC 132. In block 418, the LSO accelerator 210 of the NIC 132 segments the large packet into multiple smaller packets. Each of the smaller packets (including any headers) has a size smaller than the MSS of the network 104. Each of the smaller packets may include payload data copied or otherwise extracted from the large QUIC packet. In block 420, the LSO accelerator 210 of the NIC 132 uses the supplied QUIC header for the large QUIC packet to construct QUIC headers for each of the smaller QUIC packets that will be transmitted on the wire (i.e., the network 104). The NIC 132 may, for example, copy the QUIC header of the large packet to each of the smaller QUIC packets. The NIC 132 may also update the packet number in the QUIC header of each of the smaller packets that will be transmitted on the wire, for example by incrementing the packet number accordingly. In some embodiments, the NIC 132 may also replicate QUIC stream headers from the beginning of the QUIC payload, similar to replicating QUIC headers. Alternatively, as described above, the QUIC stream headers may have been included in the large payload at segment boundaries by the QUIC protocol stack 204 and/or driver 206. After segmenting the large QUIC packet into multiple smaller QUIC packets, the method 400 loops back to block 408 to process additional large QUIC packets. As described above, after segmentation is complete, the segmented QUIC packets may be encrypted by the NIC 132 and then transmitted to the remote device.

Figure 5:
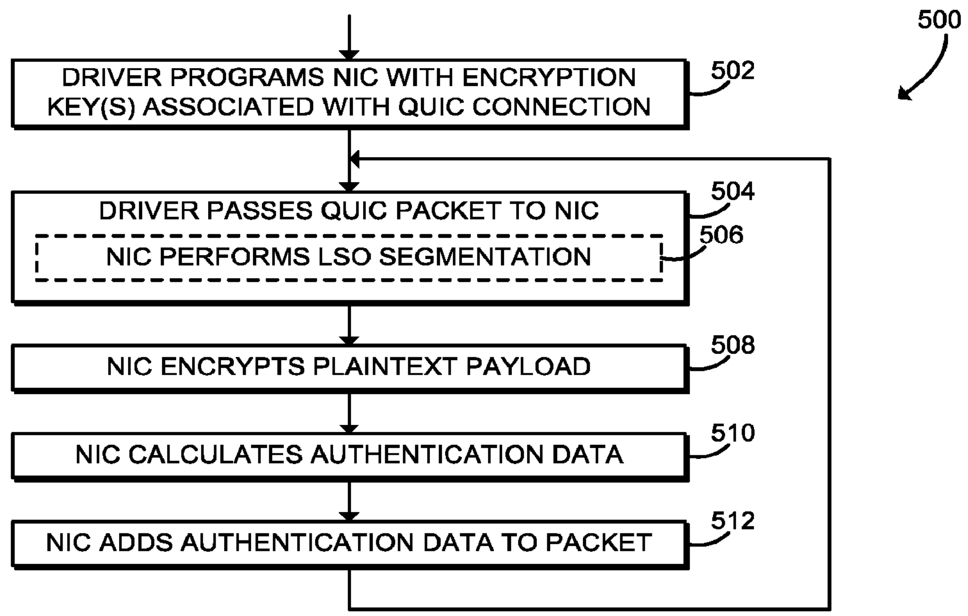
FIG. 5 is a simplified flow diagram of at least one embodiment of a method for accelerated packet encryption that may be executed by a computing device of FIGS. 1-2.

Referring now to FIG. 5, in use, the computing device 102 may execute a method 500 for accelerated packet encryption. The method 500 may be executed, for example, in connection with block 306 of FIG. 3, as described above. It should be appreciated that, in some embodiments, the operations of the method 500 may be performed by one or more components of the environment 200 of the computing device 102 as shown in FIG. 2. The method 500 begins in block 502, in which the NIC driver 206 programs the NIC 132 with one or more encryption keys associated with a QUIC connection (e.g., with a particular QUIC connection ID). The NIC 132 may be programmed with the encryption keys when a QUIC connection is opened with a remote host or when the QUIC connection is otherwise initialized. The encryption keys may be established with the remote host, for example, using a secure key exchange or other secure process. The encryption keys may be stored by the NIC 132 for the lifetime of the associated QUIC connection. In some embodiments, the encryption keys may be updated by the QUIC protocol stack 204 as needed during the lifetime of the associated QUIC connection.

In block 504, the NIC driver 206 passes a QUIC packet to the NIC 132 for transmission. In some embodiments, in block 506 the NIC 132 may perform large send offload (LSO) acceleration, as described above in connection with FIGS. 3 and 4. Of course, in some embodiments, the supplied QUIC packet may be smaller than the MSS or otherwise may not require hardware LSO acceleration.

In block 508, the NIC 132 encrypts the plaintext payload of the QUIC packet (or of the segmented QUIC packets output from LSO acceleration, as appropriate) using the encryption keys programmed for the associated QUIC connection. The NIC 132 may replace the plaintext payload of each QUIC packet with an encrypted payload. The NIC 132 may encrypt the payload using any encryption protocol appropriate for the QUIC protocol. For example, the NIC 132 may perform one or more application-layer encryption protocols, such as TLS/SSL or HTTP secure (HTTPS) encryption. Additionally, although described as a plaintext payload, it should be understood that in some embodiments, the payload of the QUIC packet may be scrambled, encrypted, or otherwise pre-processed before being encrypted by the NIC 132. In some embodiments, the NIC 132 may separately encrypt the packet number after encryption of the payload. In block 510, the NIC 132 calculates authentication data for each of the QUIC packets. For example, the NIC 132 may calculate a checksum, a signature, an authentication tag, or other information that may be used to verify that the QUIC packet is authentic or otherwise has not been tampered with. In block 512, the NIC 132 adds the authentication data to each QUIC packet. After adding the authentication data, the method 500 loops back to block 504 to continue processing packet data. As described above, after encryption is complete, the encrypted QUIC packets are transmitted to the remote host.

Figure 6:
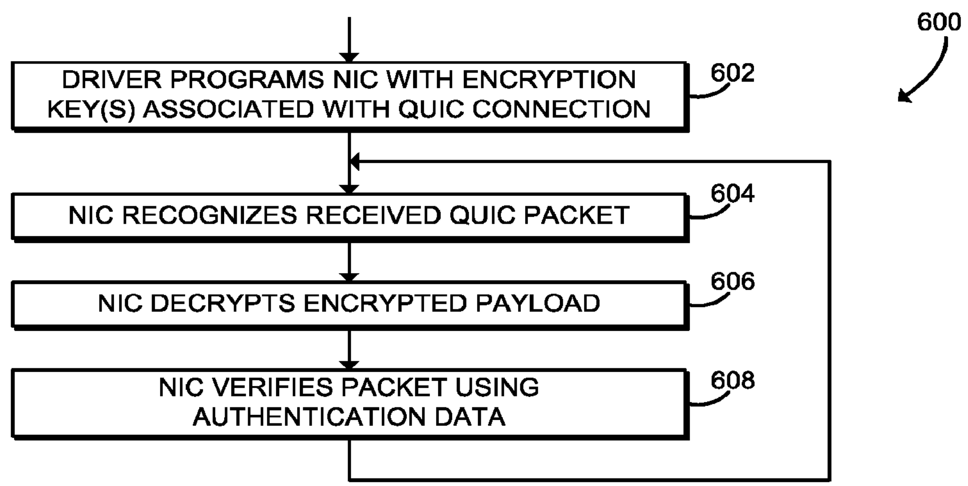
FIG. 6 is a simplified flow diagram of at least one embodiment of a method for accelerated packet decryption that may be executed by a computing device of FIGS. 1-2.

Referring now to FIG. 6, in use, the computing device 102 may execute a method 600 for accelerated packet decryption. The method 600 may be executed, for example, in connection with block 312 of FIG. 3, as described above. It should be appreciated that, in some embodiments, the operations of the method 600 may be performed by one or more components of the environment 200 of the computing device 102 as shown in FIG. 2. The method 600 begins in block 602, in which the NIC driver 206 programs the NIC 132 with one or more encryption keys associated with a QUIC connection (e.g., with a particular QUIC connection ID). As described above, the NIC 132 may be programmed with the encryption keys when a QUIC connection is opened with a remote host or when the QUIC connection is otherwise initialized. The encryption keys may be established with the remote host, for example, using a secure key exchange or other secure process. The encryption keys may be stored by the NIC 132 for the lifetime of the associated QUIC connection. In some embodiments, the encryption keys may be updated by the QUIC protocol stack 204 as needed during the lifetime of the associated QUIC connection.

In block 604, the NIC 132 recognizes a QUIC packet received over the network 104 from a remote host. The NIC 132 may parse packet headers of incoming network packets and recognize QUIC packets via a runtime configuration. For example, the NIC 132 may recognize QUIC packets as UDP packets with specific destination ports. In that example, the port numbers are supplied by the NIC driver 206.

In block 606, the NIC 132 decrypts the encrypted payload of the received QUIC packet using the encryption keys programmed for the associated QUIC connection. The NIC 132 may replace the encrypted payload of each QUIC packet with a decrypted, plaintext payload. The NIC 132 may decrypt the payload using any encryption protocol appropriate for the QUIC protocol. For example, the NIC 132 may perform one or more application-layer encryption protocols, such as TLS/SSL or HTTP secure (HTTPS) encryption. Additionally, although described as a plaintext payload, it should be understood that in some embodiments, the payload of the QUIC packet after decryption by the NIC 132 may also be further descrambled, decrypted, or otherwise post-processed. In some embodiments, the NIC 132 may separately decrypt the packet number before decryption of the payload. In block 608, the NIC 132 verifies the received QUIC packet using authentication data included in the QUIC packet. For example, the NIC 132 may verify a checksum, a signature, an authentication tag, or other information that may be used to verify that the QUIC packet is authentic or otherwise has not been tampered with. After decrypting and verifying the QUIC packet, the method 600 loops back to block 604 to continue processing QUIC packets. As described above in connection with FIG. 3, after decryption, the received packets may be forwarded to processor cores 122 for processing using receive-side scaling or filtering.

Figure 7:
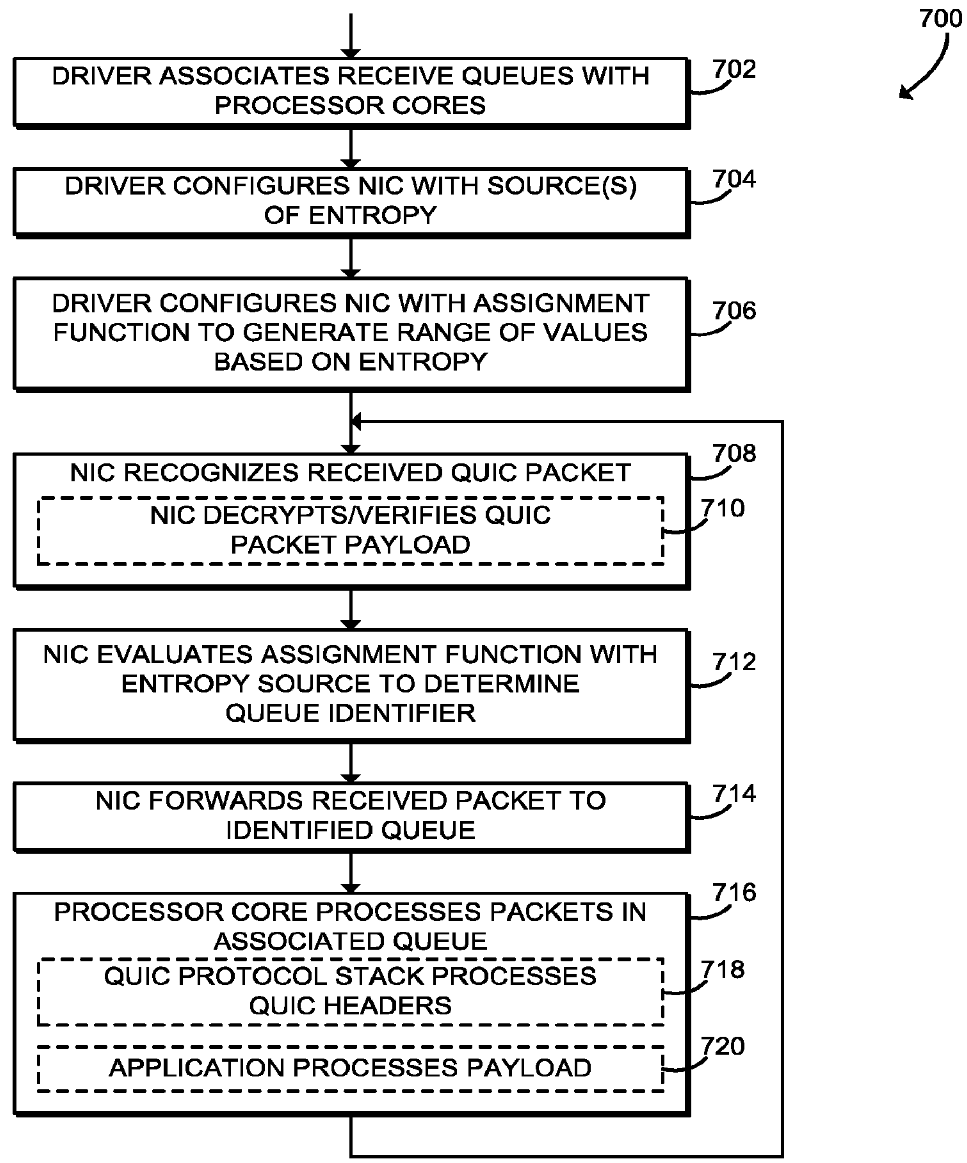
FIG. 7 is a simplified flow diagram of at least one embodiment of a method for accelerated receive-side scaling and filtering that may be executed by the computing device of FIGS. 1-2.

Referring now to FIG. 7, in use, the computing device 102 may execute a method 700 for accelerated receive-side scaling and filtering. The method 700 may be executed, for example, in connection with block 314 of FIG. 3, as described above. It should be appreciated that, in some embodiments, the operations of the method 700 may be performed by one or more components of the environment 200 of the computing device 102 as shown in FIG. 2. The method 700 begins in block 702, in which the NIC driver 206 associates one or more receive queues with the processor cores 122 of the computing device 102. As described further below, each processor core 122 processes received QUIC packets from the one or more receive queues that are associated with that processor core 122. Each receive queue has an associated queue identifier, which may be embodied as an integer value.

In block 704, the NIC driver 206 configures the NIC 132 with one or more sources of entropy within the received QUIC packets. For example, the NIC driver 206 may specify one or more fields of the QUIC header, such as the QUIC connection ID or the QUIC short packet type field. As another example, the NIC driver 206 may specify one or more fields within the plaintext payload, such as the QUIC stream ID. Thus, in some embodiments performing RSS and/or filtering based on the plaintext contents of the QUIC packet also requires performing decryption in hardware by the NIC 132. As another example, the NIC driver 206 may specify a UDP 4-tuple, including the source IP address, the source UDP port, the destination IP address, and the destination UDP port.

In block 706, the NIC driver 206 configures the NIC 132 with an assignment function to generate a range of values based on the given source of entropy. As described further below, the range of values output by the assignment function corresponds to the queue identifiers of the receive queues used to process received QUIC packets. In some embodiments, the assignment function may be used to spread received QUIC packets evenly across the receive queues (and thereby evenly across the corresponding processor cores 122). For example, the assignment function may be embodied as a hash function that operates uniformly over the range of values. As another example, the assignment function may be embodied as a scheduling function (e.g., round-robin scheduling, priority scheduling, or other scheduling algorithm). Additionally or alternatively, in some embodiments rather than spreading QUIC packets evenly across processor cores 122, in some embodiments the assignment function may perform a filtering function to assign particular QUIC packets to particular processor cores 122. For example, the assignment function may assign particular values (and thus particular receive queues) to certain applications, connection IDs, or other packet data. In that example, all QUIC packets associated with a particular application, QUIC connection, or other packet data may be processed by the same processor core 122.

In block 708, the NIC 132 recognizes a QUIC packet received over the network 104 from a remote host. As described above, the NIC 132 may parse packet headers of incoming network packets and recognize QUIC packets via a runtime configuration. For example, the NIC 132 may recognize QUIC packets as UDP packets with specific destination ports. In that example, the port numbers are supplied by the NIC driver 206. In some embodiments, in block 710 the NIC 132 may decrypt and verify the QUIC packet payload, as described above in connection with FIGS. 3 and 6.

In block 712, the NIC 132 evaluates the assignment function with the configured entropy source to determine a queue identifier. For example, the NIC 132 may extract one or more fields from the network packet (e.g., the QUIC connection ID, the QUIC short packet type field, the QUIC stream ID, the UDP 4-tuple, or other fields) and provide the extracted fields as input to the assignment function. The assignment function outputs a value that corresponds to the queue identifier. In block 714, the NIC 132 forwards the received QUIC packet to the identified receive queue. For example, the NIC 132 may store the received QUIC packet in an appropriate location in the memory 126.

In block 716, a processor core 122 processes the received QUIC packets in the associated received queue. The processor core 122 may process the QUIC packets, for example, in response to an interrupt, a DMA completion, or another notification generated by the NIC 132. The processor core 122 may perform any network or other application processing on the QUIC packet, including the packet header and plaintext payload. In some embodiments, in block 718, the QUIC protocol stack 204 may process one or more QUIC headers of the received packet. In some embodiments, in block 720 the application 202 may process the plaintext payload of the QUIC packet. After forwarding the QUIC packet data to the appropriate processor core 122, the method 700 loops back to block 708 to continue processing incoming network packet data.

It should be appreciated that, in some embodiments, the methods 300, 400, 500, 600, and/or 700 may be embodied as various instructions stored on a computer-readable media, which may be executed by the processor 120, the NIC 132, the accelerator 134, and/or other components of the computing device 102 to cause the computing device 102 to perform the respective method 300, 400, 500, 600, and/or 700. The computer-readable media may be embodied as any type of media capable of being read by the computing device 102 including, but not limited to, the memory 126, the data storage device 128, firmware devices, microcode, other memory or data storage devices of the computing device 102, portable media readable by a peripheral device 136 of the computing device 102, and/or other media.

EXAMPLES

Illustrative examples of the technologies disclosed herein are provided below. An embodiment of the technologies may include any one or more, and any combination of, the examples described below.

Example 1 includes a computing device for accelerated packet processing, the computing device comprising: a network controller; and a network controller driver to (i) program the network controller with an encryption key associated with a QUIC connection and (ii) pass a first QUIC packet to the network controller, wherein the QUIC packet comprises a UDP packet that includes a QUIC header and a plaintext payload, and wherein the first QUIC packet is associated with the QUIC connection; wherein the network controller comprises a cryptographic accelerator to encrypt the plaintext payload of the first QUIC packet with the encryption key to generate an encrypted payload for the first QUIC packet; and wherein the network controller is to transmit the first QUIC packet including the encrypted payload to a remote computing device associated with the QUIC connection in response to encryption of the plaintext payload.

Example 2 includes the subject matter of Example 1, and wherein to encrypt the plaintext payload of the first QUIC packet comprises to encrypt the plaintext payload with an application-layer encryption protocol.

Example 3 includes the subject matter of any of Examples 1 and 2, and wherein: the cryptographic accelerator is further to (i) calculate authentication data for the first QUIC packet, and (ii) add the authentication data to first QUIC packet; wherein to transmit the first QUIC packet comprises to transmit the first QUIC packet in response to addition of the authentication data.

Example 4 includes the subject matter of any of Examples 1-3, and wherein: the network controller further comprises a large send offload accelerator to segment the first QUIC packet into a plurality of segmented QUIC packets, wherein each of the segmented QUIC packets includes a plaintext payload and is not larger than a predetermined size; wherein to encrypt the plaintext payload comprises to encrypt the plaintext payload of each of the segmented QUIC packets with the encryption key to generate an encrypted payload for each of the segmented QUIC packets; and wherein to transmit the first QUIC packet comprises to transmit the plurality of segmented QUIC packets.

Example 5 includes the subject matter of any of Examples 1-4, and wherein the large send offload accelerator is further to: copy the QUIC header from the first QUIC packet to each of the segmented QUIC packets; and update a packet number of the QUIC header of each of the segmented QUIC packets.

Example 6 includes the subject matter of any of Examples 1-5, and further comprising a QUIC protocol stack to: generate the first QUIC packet, wherein the QUIC header of the first QUIC packet comprises a packet number; calculate a number of segmented QUIC packets to be generated from the first QUIC packet based on a length of the first QUIC packet; and calculate a next packet number for a next QUIC packet based on the packet number of the first QUIC packet and the number of segmented QUIC packets.

Example 7 includes the subject matter of any of Examples 1-6, and wherein the network controller driver is further to: determine whether the network controller is capable of large send offload; and segment the first QUIC packet into the plurality of segmented QUIC packets in response to a determination that the network controller is not capable of large send offload.

Example 8 includes a computing device for accelerated packet processing, the computing device comprising: a network controller; and a network controller driver to program the network controller with an encryption key associated with a QUIC connection; wherein the network controller is to (i) receive a first network packet from a remote computing device and (ii) determine whether the first network packet comprises a QUIC packet, wherein the QUIC packet comprises a UDP packet that includes a QUIC header and an encrypted payload, and wherein the QUIC packet is associated with the QUIC connection; and wherein the network controller comprises a cryptographic accelerator to decrypt the encrypted payload of the first network packet with the encryption key to generate a plaintext payload for the first network packet in response to a determination that the first network packet comprises a QUIC packet.

Example 9 includes the subject matter of Example 8, and wherein to decrypt the encrypted payload of the first network packet comprises to decrypt the encrypted payload with an application-layer encryption protocol.

Example 10 includes the subject matter of any of Examples 8 and 9, and wherein: the first network packet further comprises authentication data; and the cryptographic accelerator is further to verify the first network packet with the authentication data in response to the determination that the first network packet comprises a QUIC packet.

Example 11 includes the subject matter of any of Examples 8-10, and further comprising a first processor core and a QUIC protocol stack, wherein: the network controller further comprises a receive-side scaling accelerator to: (i) evaluate a predetermined assignment function with a predetermined entropy source to generate a queue identifier in response to decryption of the encrypted payload, and (ii) forward the first network packet to a receive queue associated with the queue identifier in response to evaluation of the predetermined assignment function; and the QUIC protocol stack is to process, by the first processor core, the first network packet in response to forwarding of the first network packet to the receive queue, wherein the first processor core is associated with the receive queue.

Example 12 includes the subject matter of any of Examples 8-11, and wherein the network controller driver is further to configure the network controller with the predetermined entropy source.

Example 13 includes the subject matter of any of Examples 8-12, and wherein the entropy source comprises a field of the QUIC header of the first network packet.

Example 14 includes the subject matter of any of Examples 8-13, and wherein the entropy source comprises a QUIC connection identifier or a QUIC short packet type field.

Example 15 includes the subject matter of any of Examples 8-14, and wherein the entropy source comprises a field of the plaintext payload of the first network packet.

Example 16 includes the subject matter of any of Examples 8-15, and wherein the entropy source comprises a QUIC stream identifier.

Example 17 includes the subject matter of any of Examples 8-16, and wherein the entropy source comprises a tuple that includes a UDP source IP address, a UDP destination IP address, a UDP source port, and a UDP destination port of the first network packet.

Example 18 includes the subject matter of any of Examples 8-17, and wherein the network controller driver is further to configure the network controller with the predetermined assignment function.

Example 19 includes the subject matter of any of Examples 8-18, and wherein the predetermined assignment function comprises a filter function based on the entropy source.

Example 20 includes the subject matter of any of Examples 8-19, and wherein the network controller driver is further to associate the first processor core with the receive queue.

Example 21 includes a method for accelerated packet processing, the method comprising: programming, by a computing device, a network controller of the computing device with an encryption key associated with a QUIC connection; passing, by the computing device, a first QUIC packet to the network controller of the computing device, wherein the QUIC packet comprises a UDP packet that includes a QUIC header and a plaintext payload, and wherein the first QUIC packet is associated with the QUIC connection; encrypting, by the network controller, the plaintext payload of the first QUIC packet with the encryption key to generate an encrypted payload for the first QUIC packet; and transmitting, by the network controller, the first QUIC packet including the encrypted payload to a remote computing device associated with the QUIC connection in response to encrypting the plaintext payload.

Example 22 includes the subject matter of Example 21, and wherein encrypting the plaintext payload of the first QUIC packet comprises encrypting the plaintext payload with an application-layer encryption protocol.

Example 23 includes the subject matter of any of Examples 21 and 22, and further comprising: calculating, by the network controller, authentication data for the first QUIC packet; and adding, by the network controller, the authentication data to the first QUIC packet; wherein transmitting the first QUIC packet comprises transmitting the first QUIC packet in response to adding the authentication data.

Example 24 includes the subject matter of any of Examples 21-23, and further comprising: segmenting, by the network controller, the first QUIC packet into a plurality of segmented QUIC packets, wherein each of the segmented QUIC packets includes a plaintext payload and is not larger than a predetermined size; wherein encrypting the plaintext payload comprises encrypting the plaintext payload of each of the segmented QUIC packets with the encryption key to generate an encrypted payload for each of the segmented QUIC packets; and wherein transmitting the first QUIC packet comprises transmitting the plurality of segmented QUIC packets.

Example 25 includes the subject matter of any of Examples 21-24, and further comprising: copying, by the network controller, the QUIC header from the first QUIC packet to each of the segmented QUIC packets; and updating, by the network controller, a packet number of the QUIC header of each of the segmented QUIC packets.

Example 26 includes the subject matter of any of Examples 21-25, and further comprising: generating, by the computing device, the first QUIC packet, wherein the QUIC header of the first QUIC packet comprises a packet number; calculating, by the computing device, a number of segmented QUIC packets to be generated from the first QUIC packet based on a length of the first QUIC packet; and calculating, by the computing device, a next packet number for a next QUIC packet based on the packet number of the first QUIC packet and the number of segmented QUIC packets.

Example 27 includes the subject matter of any of Examples 21-26, and further comprising: determining, by the computing device, whether the network controller is capable of large send offload; and segmenting, by a processor core of the computing device, the first QUIC packet into the plurality of segmented QUIC packets in response to determining that the network controller is not capable of large send offload.

Example 28 includes a method for accelerated packet processing, the method comprising: programming, by a computing device, a network controller of the computing device with an encryption key associated with a QUIC connection; receiving, by the network controller, a first network packet from a remote computing device; determining, by the network controller, whether the first network packet comprises a QUIC packet, wherein the QUIC packet comprises a UDP packet that includes a QUIC header and an encrypted payload, and wherein the QUIC packet is associated with the QUIC connection; and decrypting, by the network controller, the encrypted payload of the first network packet with the encryption key to generate a plaintext payload for the first network packet in response to determining that the first network packet comprises a QUIC packet.

Example 29 includes the subject matter of Example 28, and wherein decrypting the encrypted payload of the first network packet comprises decrypting the encrypted payload with an application-layer encryption protocol.

Example 30 includes the subject matter of any of Examples 28 and 29, and wherein the first network packet further comprises authentication data, the method further comprising verifying, by the network controller, the first network packet with the authentication data in response to determining that the first network packet comprises a QUIC packet.

Example 31 includes the subject matter of any of Examples 28-30, and further comprising: evaluating, by the network controller, a predetermined assignment function with a predetermined entropy source to generate a queue identifier in response to decrypting the encrypted payload; forwarding, by the network controller, the first network packet to a receive queue associated with the queue identifier in response to evaluating the predetermined assignment function; and processing, by a first processor core of the computing device, the first network packet in response to forwarding the first network packet to the receive queue, wherein the first processor core is associated with the receive queue.

Example 32 includes the subject matter of any of Examples 28-31, and further comprising configuring, by the computing device, the network controller with the predetermined entropy source.

Example 33 includes the subject matter of any of Examples 28-32, and wherein the entropy source comprises a field of the QUIC header of the first network packet.

Example 34 includes the subject matter of any of Examples 28-33, and wherein the entropy source comprises a QUIC connection identifier or a QUIC short packet type field.

Example 35 includes the subject matter of any of Examples 28-34, and wherein the entropy source comprises a field of the plaintext payload of the first network packet.

Example 36 includes the subject matter of any of Examples 28-35, and wherein the entropy source comprises a QUIC stream identifier.

Example 37 includes the subject matter of any of Examples 28-36, and wherein the entropy source comprises a tuple that includes a UDP source IP address, a UDP destination IP address, a UDP source port, and a UDP destination port of the first network packet.

Example 38 includes the subject matter of any of Examples 28-37, and further comprising configuring, by the computing device, the network controller with the predetermined assignment function.

Example 39 includes the subject matter of any of Examples 28-38, and wherein the predetermined assignment function comprises a filter function based on the entropy source.

Example 40 includes the subject matter of any of Examples 28-39, and further comprising associating, by the computing device, the first processor core with the receive queue.

Example 41 includes one or more computer-readable storage media comprising a plurality of instructions stored thereon that, in response to being executed, cause a computing device to: program a network controller of the computing device with an encryption key associated with a QUIC connection; pass a first QUIC packet to the network controller of the computing device, wherein the QUIC packet comprises a UDP packet that includes a QUIC header and a plaintext payload, and wherein the first QUIC packet is associated with the QUIC connection; encrypt, by the network controller, the plaintext payload of the first QUIC packet with the encryption key to generate an encrypted payload for the first QUIC packet; and transmit, by the network controller, the first QUIC packet including the encrypted payload to a remote computing device associated with the QUIC connection in response to encrypting the plaintext payload.

Example 42 includes the subject matter of Example 41, and wherein to encrypt the plaintext payload of the first QUIC packet comprises to encrypt the plaintext payload with an application-layer encryption protocol.

Example 43 includes the subject matter of any of Examples 41 and 42, and further comprising a plurality of instructions stored thereon that, in response to being executed, cause the computing device to: calculate, by the network controller, authentication data for the first QUIC packet; and add, by the network controller, the authentication data to the first QUIC packet; wherein to transmit the first QUIC packet comprises to transmit the first QUIC packet in response to adding the authentication data.

Example 44 includes the subject matter of any of Examples 41-43, and further comprising a plurality of instructions stored thereon that, in response to being executed, cause the computing device to: segment, by the network controller, the first QUIC packet into a plurality of segmented QUIC packets, wherein each of the segmented QUIC packets includes a plaintext payload and is not larger than a predetermined size; wherein to encrypt the plaintext payload comprises to encrypt the plaintext payload of each of the segmented QUIC packets with the encryption key to generate an encrypted payload for each of the segmented QUIC packets; and wherein to transmit the first QUIC packet comprises to transmit the plurality of segmented QUIC packets.

Example 45 includes the subject matter of any of Examples 41-44, and further comprising a plurality of instructions stored thereon that, in response to being executed, cause the computing device to: copy, by the network controller, the QUIC header from the first QUIC packet to each of the segmented QUIC packets; and update, by the network controller, a packet number of the QUIC header of each of the segmented QUIC packets.

Example 46 includes the subject matter of any of Examples 41-45, and further comprising a plurality of instructions stored thereon that, in response to being executed, cause the computing device to: generate, by the computing device, the first QUIC packet, wherein the QUIC header of the first QUIC packet comprises a packet number; calculate, by the computing device, a number of segmented QUIC packets to be generated from the first QUIC packet based on a length of the first QUIC packet; and calculate, by the computing device, a next packet number for a next QUIC packet based on the packet number of the first QUIC packet and the number of segmented QUIC packets.

Example 47 includes the subject matter of any of Examples 41-46, and further comprising a plurality of instructions stored thereon that, in response to being executed, cause the computing device to: determine whether the network controller is capable of large send offload; and segment, by a processor core of the computing device, the first QUIC packet into the plurality of segmented QUIC packets in response to determining that the network controller is not capable of large send offload.

Example 48 includes one or more computer-readable storage media comprising a plurality of instructions stored thereon that, in response to being executed, cause a computing device to: program a network controller of the computing device with an encryption key associated with a QUIC connection; receive, by the network controller, a first network packet from a remote computing device; determine, by the network controller, whether the first network packet comprises a QUIC packet, wherein the QUIC packet comprises a UDP packet that includes a QUIC header and an encrypted payload, and wherein the QUIC packet is associated with the QUIC connection; and decrypt, by the network controller, the encrypted payload of the first network packet with the encryption key to generate a plaintext payload for the first network packet in response to determining that the first network packet comprises a QUIC packet.

Example 49 includes the subject matter of Example 48, and wherein to decrypt the encrypted payload of the first network packet comprises to decrypt the encrypted payload with an application-layer encryption protocol.

Example 50 includes the subject matter of any of Examples 48 and 49, and wherein: the first network packet further comprises authentication data; and the one or more computer-readable storage media further comprises a plurality of instructions stored thereon that, in response to being executed, cause the computing device to verify, by the network controller, the first network packet with the authentication data in response to determining that the first network packet comprises a QUIC packet.

Example 51 includes the subject matter of any of Examples 48-50, and further comprising a plurality of instructions stored thereon that, in response to being executed, cause the computing device to: evaluate, by the network controller, a predetermined assignment function with a predetermined entropy source to generate a queue identifier in response to decrypting the encrypted payload; forward, by the network controller, the first network packet to a receive queue associated with the queue identifier in response to evaluating the predetermined assignment function; and process, by a first processor core of the computing device, the first network packet in response to forwarding the first network packet to the receive queue, wherein the first processor core is associated with the receive queue.

Example 52 includes the subject matter of any of Examples 48-51, and further comprising a plurality of instructions stored thereon that, in response to being executed, cause the computing device to configure the network controller with the predetermined entropy source.

Example 53 includes the subject matter of any of Examples 48-52, and wherein the entropy source comprises a field of the QUIC header of the first network packet.

Example 54 includes the subject matter of any of Examples 48-53, and wherein the entropy source comprises a QUIC connection identifier or a QUIC short packet type field.

Example 55 includes the subject matter of any of Examples 48-54, and wherein the entropy source comprises a field of the plaintext payload of the first network packet.

Example 56 includes the subject matter of any of Examples 48-55, and wherein the entropy source comprises a QUIC stream identifier.

Example 57 includes the subject matter of any of Examples 48-56, and wherein the entropy source comprises a tuple that includes a UDP source IP address, a UDP destination IP address, a UDP source port, and a UDP destination port of the first network packet.

Example 58 includes the subject matter of any of Examples 48-57, and further comprising a plurality of instructions stored thereon that, in response to being executed, cause the computing device to configure the network controller with the predetermined assignment function.

Example 59 includes the subject matter of any of Examples 48-58, and wherein the predetermined assignment function comprises a filter function based on the entropy source.

Example 60 includes the subject matter of any of Examples 48-59, and further comprising a plurality of instructions stored thereon that, in response to being executed, cause the computing device to associate the first processor core with the receive queue.

The invention claimed is:

1. One or more non-transitory computer-readable storage media comprising a plurality of instructions stored thereon that, in response to being executed, cause one or more processors to:

configure circuitry of a network interface controller to perform segmentation of a payload of a Quick User Datagram Protocol (UDP) Internet Connection (QUIC) packet to generate payload segments, to perform encryption of the payload segments, to generate a QUIC header for an encrypted payload segment of the encrypted payload segments based on a copy of a QUIC header of the QUIC packet, and cause transmission of packets with generated QUIC headers and encrypted QUIC payload segments and configure a second circuitry of the network interface controller to decrypt a received encrypted QUIC payload segment, perform receive side scaling (RSS) to identify a core to process the received decrypted QUIC payload segment, and copy the decrypted payload segment to a queue associated with the identified core.

2. The one or more computer-readable storage media of claim 1, wherein the QUIC packet comprises a UDP packet that includes the QUIC header and the payload, and wherein the QUIC packet is associated with a QUIC connection.

3. The one or more computer-readable storage media of claim 1, further comprising a plurality of instructions stored thereon that, in response to being executed, cause the one or more processors to:

program the network interface controller with an encryption key associated with a QUIC connection, wherein the QUIC packet is associated with the QUIC connection.

4. The one or more computer-readable storage media of claim 3, wherein the circuitry is to perform encryption of the payload segments based on the encryption key.

5. The one or more computer-readable storage media of claim 3, wherein the circuitry is to perform encryption of the payload segments based on an application-layer encryption protocol.

6. The one or more computer-readable storage media of claim 1, further comprising a plurality of instructions stored thereon that, in response to being executed, cause the one or more processors to:

program the network interface controller to:

update a packet number of the copy of the QUIC header of at least one of the packets with the encrypted QUIC payload segments to differentiate packets with different encrypted QUIC payload segments.

7. An apparatus comprising:

an interface and a network interface controller coupled to the interface, the network interface controller comprising:

a direct memory access (DMA) circuitry;

a host interface;

a network interface;

circuitry to segment a payload of a Quick User Datagram Protocol (UDP) Internet Connection (QUIC) packet, to generate payload segments, and to perform encryption of the payload segments prior to transmission of the QUIC payload segments; and second circuitry to decrypt an encrypted QUIC payload received from a sender network interface device, perform receive side scaling (RSS) to identify a core to process the received decrypted QUIC payload, and copy the decrypted payload to a queue associated with the identified core.

8. The apparatus of claim 7, wherein the QUIC packet comprises a UDP packet that includes a QUIC header and the payload, and wherein the QUIC packet is associated with a QUIC connection.

9. The apparatus of claim 7, wherein the circuitry is to encrypt the payload segments based on an encryption key associated with a QUIC connection, wherein the QUIC packet is associated with a QUIC connection.

10. The apparatus of claim 7, wherein the circuitry is to encrypt the payload segments based on an encryption key associated with a QUIC connection, wherein the circuitry is to perform encryption of the payload segments based on an application-layer encryption protocol.

11. The apparatus of claim 7, wherein to segment the QUIC packet to generate payload segments comprises:

update a packet number of the copy of a QUIC header of the encrypted QUIC payload segments to differentiate packets with different encrypted QUIC payload segments.

12. A method comprising:

a network interface controller comprising: a host interface, direct memory access (DMA) circuitry, and host interface performing:

segmenting a payload of a Quick User Datagram Protocol (UDP) Internet Connection (QUIC) packet into a plurality of payload segments;

performing encryption of the payload segments;

generating segmented QUIC packets with the encrypted payload segments with QUIC packet headers based on a copy of a QUIC header of the QUIC packet, wherein the QUIC packet headers for different segmented QUIC packets include packet numbers that differentiate different encrypted payload segments;

transmitting the segmented QUIC packets with encrypted payloads; and decrypting a received encrypted QUIC payload segment and performing receive side scaling (RSS) to determine a queue associated with a processor of a plurality of processors for the processor to process the received decrypted QUIC payload segment.

13. The method of claim 12, wherein the encrypting the payload segments comprises encrypting the payload segments based on an encryption key associated with a QUIC connection and based on an application-layer encryption protocol.

14. The method of claim 12, wherein the generating segmented QUIC packets with the encrypted payload segments with QUIC packet headers based on a copy of a QUIC header of the QUIC packet comprises updating a packet number of the copy of the QUIC header for the segmented QUIC packets.

* * * * *